Dec. 22, 1959    R. H. HURLEY ET AL    2,918,377
PACKAGED FOODSTUFFS
Filed Jan. 16, 1956
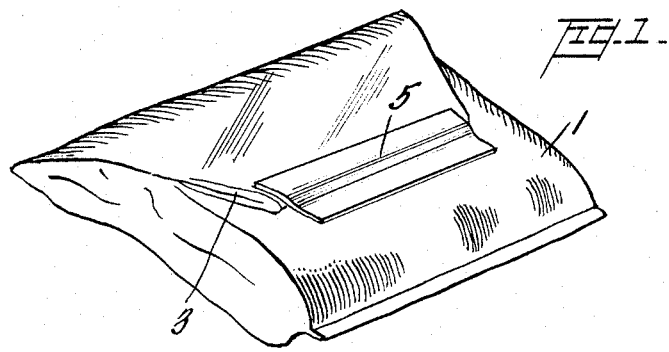
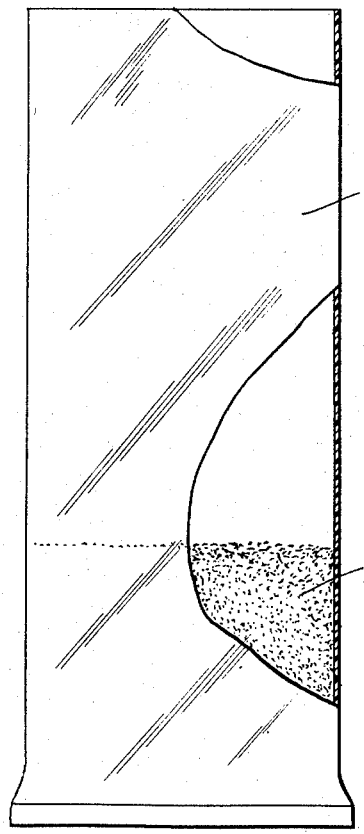
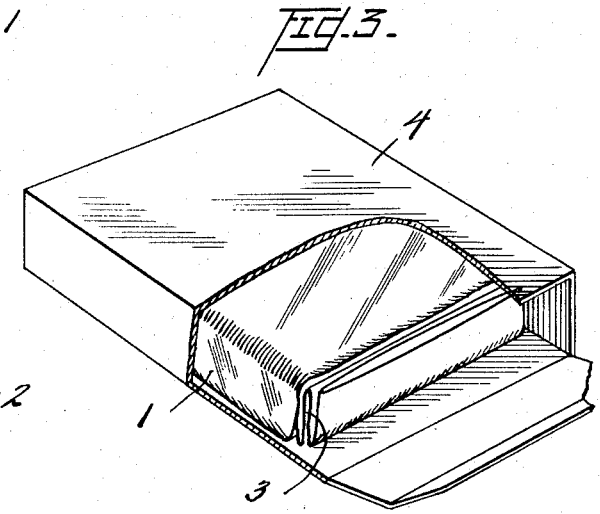
INVENTORS
Richard H. Hurley
Stewart Rowe,
BY Watson, Cole, Grindle & Watson
ATTORNEYS

United States Patent Office 2,918,377
Patented Dec. 22, 1959

2,918,377

PACKAGED FOODSTUFFS

Richard H. Hurley, New York, N.Y., and Stewart Rowe, Cincinnati, Ohio, assignors to The Procter & Gamble Company, Cincinnati, Ohio, a corporation of Ohio Application January 16, 1956, Serial No. 559,294

1 Claim. (Cl. 99—171)

This invention relates to the packaging of culinary mixes in pliable containers suitable for use in the preparation of cooked food products. More particularly, this invention relates to a cake mix package including a pliable container having dimensions such that upon the addition of liquids to the particulate cake mix therein, a "shake-mixing" manipulation of the container and its contents results in the formation of a cake batter which will produce a highly acceptable cake.

In order for a housewife to make cake batter from the usual packaged cake mix, she must first open the package and empty the contents of the package into a mixing bowl. One or more supplemental ingredients, e.g. water, milk, eggs, etc., are then added to the cake mix. The addition of these supplemental ingredients to the prepared cake mix is usually, although not invariably, done in a stepwise manner. The next step involves blending the cake mix and added ingredients. For the large majority of housewives who do not own electrically operated mixing devices, this blending operation must be accomplished through the use of hand operated mixing tools. These mixing tools more commonly take the form of either metal or wooden spoons which are sometimes slotted or perforated; less frequently, hand operated rotary mixers are utilized. These mixing tools serve as a means for intimately blending the ingredients and for incorporating a quantity of finely dispersed air into the cake batter. If insufficient blending or incorporation of air occurs, the cake batter will not behave properly when baked; the resultant cake will have a smaller volume than is desirable and an unsatisfactory grain structure.

A number of difficulties are encountered in the hand tool method of mixing cake batter. When the supplemental ingredients are added in a stepwise manner, as is usually the case, a separate mixing operation is necessary after each addition; the period of time over which the batter must be mixed, therefore, may be quite prolonged. There are few persons who are able to manipulate these hand operated mixing tools with equal facility with either hand. The necessity for use of only one hand throughout the entire mixing operation, as a matter of course, results in early fatigue. This fatigue quite generally induces the housewife to terminate the mixing operation prematurely, i.e. before the requisite blending and incorporation of finely dispersed air is achieved. Furthermore, during the later period of mixing, at which time muscular fatigue becomes a distinct annoyance, inadvertent removal of portions of the batter from the mixing bowl through splashing is a common occurrence. Also, spoons, dishes, mixing bowls, etc., are all coated with the viscous batter and must be washed.

Even electrically operated mixing devices have certain disadvantages when used as a means for preparing cake batter. In addition to the washing problem mentioned above, spattering of the cake batter often occurs and the resultant mess must be cleaned and washed from clothing, adjacent utensils, table surfaces, walls etc. Damage often occurs when a spoon or similar implement becomes entangled in the beaters of an electric mixer. Furthermore, mechanical failure of electric mixers is a distinct possibility, and resort must be had to some other means of mixing cake batter.

It is an object of this invention to provide a means whereby a cake batter may be prepared in the original cake mix container.

It is a further object to provide a package, for the purpose expressed above, which is suitable as a means for marketing cake mix.

It is a further object to provide in combination a cake mix and a container wherein a cake batter may be prepared by the addition of liquids to the cake mix contained therein, closure of the container, and agitation of the container and its contents by manual shaking.

It is a further object to provide means for the preparation of cakes wherein liquids may be added to a pliable bag containing particulate cake mix and upon vigorous manual shaking of the bag and contents a satisfactory cake batter will be formed.

A further object is to provide a means and method for overcoming the disadvantages referred to above in connection with the preparation of cake batter from prepared cake mixes.

Further objects and advantageous features will appear from the following detailed description.

In the drawings, Figure 1 is a view of a "sales package" (as hereinafter defined).

Figure 2 is a view of a pliable bag which contains cake mix and which is extended to its full length, thereby illustrating the relationship between the size of the bag and the amount of cake mix therein.

Figure 3 is a view of a "sales carton" (as hereinafter defined) with a portion of the outer carton cut away to reveal a pliable bag containing cake mix.

The following discussion will serve to explain the drawings in greater detail, but it is not intended that the drawings, which express only preferred forms of the invention, should limit the general nature of this discussion.

The word "package" as used herein designates in combination a bag 1 composed of a pliable material such as "plastic" and a cake mix 2 or other suitable baking preparation in particulate form contained therein. The bag may be sealed in any of the customary manners or may be unsealed, in which case the material not necessary for the physical accommodation of the baking preparation is folded 3 or rolled up and the container placed in a carton 4 to hold the cake mix in the bag. The word "container" as used herein designates the pliable bag 1 which is the actual mixing vessel. The term "sales package" as used herein designates the package as defined above wherein the plastic bag is of a construction such that a label and instructions can be printed thereon and the excess length can be folded 3 or rolled up and secured with tape 5 or a metal closure, the combination to be marketed in this form. The term "sales carton" as used herein designates the package as defined above contained within a rigid or semi-rigid self-supporting outer carton constructed of pasteboard, cardboard or the like, the combination to be marketed in this form (Fig. 3). The cubic capacity of the pliable plastic bag will generally be about double the cubic capacity of the rigid or semi-rigid self-supporting outer carton.

The present invention is based upon the discovery that a liquid-proof bag, suitable as a packing container for cake mix but greatly oversized for that purpose, serves admirably as the sole "utensil" for incorporating liquid ingredients and air with the powdered cake mix initially packaged therein, to make "shake-mixed" cake batter of excellent quality.

Thus, the present invention includes packing for commercial marketing, a particulate prepared cake mix or other baking preparation in a pliable bag (preferably a pliable plastic bag) which has a total capacity much greater than the bulk volume of the dry cake mix therein, and usually about two to three times the bulk volume of said prepared mixture, whereby merely by adding liquid ingredients, closing the open end of the bag, and shaking vigorously, an aerated batter ready for baking is obtained. The pliable bag must be constructed of material which is both water and oil proof and which is compatible with food products for prolonged periods of storage.

The housewife, when she desires to make a cake utilizing our invention, first opens the pliable bag containing the cake mix. Whatever liquids are necessary to complete the batter are then added to the bag. These liquids may take the form of milk, water, milk and eggs, or water and eggs, etc. and in some instances even liquid shortening. Any other liquid which provides the requisite fluidity to a cake batter may be employed in conjunction with the proper type of cake mix preparation. Examples of some of the less frequently used liquids are as follows: sour milk, sweet cream, sour cream, buttermilk, prune juice, apricot juice, orange juice, pineapple juice, syrups, rose water, burnt sugar syrup, pumpkin puree, cherry brandy, wines, coffee, tomato soup, apple sauce, jam, jelly, crushed fruits, molasses, cider, honey and coconut milk.

When the bag is a component of a sales carton, the liquids may be added to the bag either before or after the bag is removed from the outer carton. If it is necessary to use eggs, it is preferable but not essential to break the yolk before adding it to the ingredients in the bag. The bag is then closed. This may be done by simply twisting only so much of the material at the open end of the bag as is necessary to insure a liquid proof seal. As an alternative, the open end of the bag may be sealed shut with a string, rubber band, clamp, etc. Such a sealing device may be put into the package by the manufacturer or may be provided by the housewife. At this point some prefer to knead the container and its contents briefly so as to break up any small lumps which may have formed, but this step is not essential since vigorous shaking will accomplish the same result. The bag, which contains all the cake batter ingredients, is then manipulated with a shaking motion until the ingredients are thoroughly mixed and the necessary finely dispersed air is incorporated into the mixture. After the required shake time has elapsed, the batter is poured from the pliable bag into properly prepared baking pans which may then be placed in a baking oven.

The time of shaking varies with the proficiency of the operator and with the degree of agitation. The degree of interdispersion of the dry ingredients already accomplished by the manufacturer of the prepared mix also affects the agitation time required. With vigorous shaking, the shake time may be less than one minute; the usual time, however, is between one and three minutes. The nature of the shortening is also important as a factor affecting the shake time; cake mixes containing soft shortening may require a shorter shake time than do mixes containing hard shortenings. Most prepared cake mixes also contain as emulsifying agents shortenings which contain a greater proportion of mono- and diglycerides than do ordinary fats. These shortenings permit the use of a higher ratio of sugar to flour than can be tolerated with ordinary shortening. Other factors being equal, cake mixes containing any of the well known "high ratio" agents (monoglycerides or their functional equivalents) require a shorter shake time than mixes which contain only ordinary shortening.

Such high-ratio agents include free fatty acids derived from edible oil, polyethylene oxide esters of fatty acids, fatty acid partial esters of polyglycerol, of sugar alcohols, of dehydrated sugar alcohols and the like (all having one or more unesterified hydroxyl groups), tartaric acid esters of fatty acids, and numerous other recognized organic compounds which broadly are chartcerized by an oil-soluble portion and one or more unesterified —OH groups or ether oxygen atoms. These high ratio agents are nonionic alkyl and alkylene ethers and esters containing only carbon, hydrogen, and oxygen atoms. The high-ratio agents will generally have a total of from 15 to 60 carbon atoms in the molecule and will also have at least one alkyl or alkylene group having from about 12 to 22 carbon atoms in a single straight chain.

Certain types of packaged cake mixes contain no shortening. The lightness characteristic of sponge cake is attributable to the process of whipping or beating extensively an egg and sugar mixture thereby causing the air to be held in pockets or small cells which expand during baking and cause the cake to rise. Any grease which is present will act as an anti-foam agent and thereby prevent formation of a proper egg foam. So-called "angel food" cakes are prepared in a similar manner and the same problems are encountered. Cakes of the type represented by sponge and angel food cakes cannot be prepared by shake-mixing because of the severe whipping action which is required.

It has been observed that more complete mixing may be obtained during a given period of time with the "shake-mixing" method than can be obtained by hand mixing or perhaps even with the aid of mechanical mixing devices. When the "shake-mixing" method is used, at any given instant practically the entire mass is subject to agitation. In contrast, when hand operated mixing means, or in some instances when electrical mixing devices are used, only a fraction of the cake batter is exposed to agitation at any given instant. The efficiency of certain electrical mixers may be of such magnitude that the ingredients in the finished batter are adequately and uniformly blended and the requisite amount of finely dispersed air is incorporated into the batter, but this same degree of efficiency cannot be approached by hand mixing tools.

A wide variety of cakes can be produced by the process of this invention including white, yellow, chocolate and spice. Preferred ranges of cake ingredients are as follows:

|  | Percent |
| --- | --- |
| Sugar | 38–48 |
| Flour | 28–45 |
| Milk powder | 0– 5 |
| Shortening | 9–16 |
| Leavening | 1– 4 |
| Cocoa | 0– 7 |
| Egg solids | 0– 6 |
| Flavoring (including spices) | Minor amounts |
| Coloring | do |

The bag which comprises both the packing container and the shake-mixing utensil of the invention must be large enough not only to contain the dry mix and added liquids but also (a) to provide excess bag material for closure and for grasping firmly in the two hands of the operator, and (b) to provide free air space within which the batter mix may move back and forth in the mixing and aerating operation.

The following is an example of the volume relationships which give good results in the practice of the shake-mixing method.

*Example 1*

|  | Volume (cu. inches) | Volume in percent considering 70 cu. inches as 100% |
| --- | --- | --- |
| Dry mix of the above tabulated type | 70 | 100 |
| Liquids | 18.6–21 (10.7–12 fl. oz.) | 26–30 |
| Plastic bag | 156 (usable) | 222 |
| Plastic bag | 110 (usable-minimum) | 157 |

Usable capacity refers to the "shaking space" plus batter volume capacity of the plastic bag after the operation of twisting the top for closure, which results in waste bag length. During the shake mixing process, a certain amount of the batter adheres to the walls of the pliable bag. If the usable capacity of the bag is too great, the coating thus formed results in an appreciable diminution of the batter available for mixing and aeration. A plastic bag with a usuable capacity of about 220% of the dry cake mix has sufficient volume over and above the bag material needed for closure and mixing after the addition of the liquids. A plastic bag with a usable capacity of less than about 150% of the volume of the dry mix does not afford sufficient volume and a capacity not less than about 160% is preferred. A flat (tubular when opened) plastic bag about 7 inches wide by 16 inches long provides the desired usable capacity for 20 oz. of prepared cake mix having a volume of about 70 cu. inches and requiring the addition of 10 to 12.5 fl. oz. of liquids. The requisite bag size and usable capacity will, of course, vary depending upon the weight and volume of the dry prepared mix and the volume of the liquids to be added. The total volume capacity of the pliable bag should be at least about 175% of the volume of the dry mix in order to afford a minimum usable capacity of about 157%. However, this total volume capacity is subject to considerable variation depending on the means employed in closing the open end of the bag. If a clamp or rubber band is used for closure, relatively little of the total volume capacity is lost; if however, the bag is twisted for closure, there may be considerable loss. In the latter instance, the required volume capacity of the bag may be 300% or more of the volume of the dry mix. Thus the total capacity of the bag will usually be of the order of two to three times the bulk volume of the dry mix.

Any plastic material which has no deleterious effect on culinary mixes and which can be formed into a liquid-tight pliable bag strong enough to withstand the stresses placed upon it during the shake mixing process is satisfactory for use in the practice of the invention. The following plastics along with preferred thicknesses are representative of the types of materials from which the pliable bag can be constructed: polyethylene, .001–.003 inch; vinyl such as copolymers of vinyl chloride and vinyl acetate, .001–.003 inch; polyvinylidene chloride ("Saran"), .001–.003 inch; rubber hydrochloride ("Pliofilm"), .001–.0024 inch. When the pliable bag comprises the only enclosing element of a sales package and is therefore not contained within a protective carton, the plastic film should be of greater thickness than otherwise. Plastic films of a thickness of from about 0.002 inch to 0.006 inch are preferred for this purpose.

The compositions of three varieties of one type of cake mix suitable for use in the invention are given below. It should be noted that this type of cake mix does not require the addition of fresh eggs; the addition of milk, however is necessary. The numbers express percent by weight.

*Example II*

| Ingredients Packed In Bag as Described Above | White Cake | Yellow Cake | Chocolate Cake |
| --- | --- | --- | --- |
| Sugar | 42.44 | 41 | 39 |
| Shortening | 10.6 | 13 | 11.5 |
| Flour | 42.8 | 40.5 | 38.25 |
| Salt | 0.8 | 0.6 | 1.0 |
| Soda | 0.68 | 1.05 | 1.3 |
| Monocalcium phosphate | 0.34 | 0.25 | |
| Soda alum phosphate | 0.64 | 0.92 | 0.73 |
| Yolk | | 0.62 | 0.62 |
| Albumin | 1.5 | 1.86 | 1.86 |
| Flavor | 0.2 | 0.2 | 0.2 |
| Cocoa | | | 5.64 |
| Color | | 0.1 | |

17 to 18 ounces of the type of mix shown above requires the addition of approximately 11 fluid ounces of milk for the white or yellow cakes and approximately 12 fluid ounces of milk for the chocolate cake. The addition of these ingredients is followed by reclosure of the container and vigorous shaking thereof for two to three minutes.

The compositions of three varieties of a type of cake mix which requires the addition of fresh eggs is given below. The numbers express percent by weight.

*Example III*

| Ingredients Packed in Bags as Described Above | White Cake | Yellow Cake | Chocolate Cake |
| --- | --- | --- | --- |
| Sugar | 41.94 | 42.5 | 44.39 |
| Shortening | 11.5 | 11.5 | 12.5 |
| Non-fat milk solids | 2.8 | 2.0 | 1.6 |
| Flour | 41 | 40.6 | 34.0 |
| Salt | 0.85 | 1.1 | 1.2 |
| Monocalcium phosphate | 0.5 | 0.55 | 0.23 |
| Sodium Bicarbonate | 0.75 | 0.8 | 1.14 |
| Sodium acid pyrophosphate | 0.56 | 0.75 | 0.34 |
| Flavor | 0.1 | 0.1 | 0.1 |
| Cocoa | | | 5.0 |
| Color | | 0.1 | |

19 to 20 ounces of the type of mix shown above requires the addition of two whole eggs and approximately eight fluid ounces of water for the yellow and chocolate cakes and 2 egg whites and approximately eight fluid ounces of water for the white cakes. The addition of these ingredients is followed by reclosure of the container and vigorous shaking thereof for two to three minutes.

*Example IV*

Ingredients packed in
bag as described above:                   White cake
- Sugar _____ 53
- Flour _____ 38
- Baking powder _____ 2.25
- Non-fat milk solids _____ 5.75
- Salt _____ 1

To 17¾ ounces of the mix shown above the user adds two whole eggs, four fluid ounces of a liquid shortening and eight fluid ounces of water. The mixture is shaken for one minute, poured into prepared pans, and baked.

The cake mix formulas given above should be considered as representative only of cake mixes which are adaptable to my invention and not as a limitation on the scope of my invention. If desired, the prepared mix may contain both egg solids and milk solids as well as the other necessary ingredients, so that only water is required to make a complete batter. In such a case, twenty ounces of mix and approximately eleven to twelve fluid ounces of water are sufficient to make a full size cake.

Prepared cake mixes of approximately the composition detailed in Examples II and III are available on the market at the present time.

Dry prepared mixes suitable for making muffins, pancakes, waffles, and the like may similarly be used in the practice of the invention. It is only required that the batter to be formed be of such consistency as to be shakeable in nature. A stiff batter similar to bread dough is not suitable for use in the practice of the present invention. These culinary mixes may be prepared in any conventional manner. Compositions of muffin, pancake, and waffle mixes are well-known in the art, and the dry prepared mixes are readily available.

Having thus described our invention, what we claim is:

A package for commercial distribution and sale, comprising in combination a waterproof, oil-proof pliable bag and within said bag a body of particulate cake mix comprising flour, sugar and a glyceride shortening including a high ratio agent selected from the group consisting of nonionic alkyl and alkylene ethers and esters containing only carbon, hydrogen, and oxygen atoms and having at least one unesterified hydroxyl group, and at least one group selected from the class consisting of alkyl and alkylene groups having 12 to 22 carbon atoms in a single straight chain, said bag having a total capacity of about two to three times the bulk volume of said cake mix, said bag, upon closure of the open end, providing a usable capacity of at least about 157% and less than 300% of the bulk volume of said cake mix, and said bag being of dimensions such that upon the addition to said cake mix within said bag of the liquid ingredients required by the cake recipe followed by closure of said bag, manipulation of said package with a shaking motion results in the intimate blending of said cake mix and said liquid ingredients to form a cake batter and in the incorporation of finely dispersed air in the cake batter thus formed to the degree which is desirable for the formation of a satisfactory cake, said usable capacity consisting of free air shaking space plus batter volume capacity.

References Cited in the file of this patent

UNITED STATES PATENTS

| | | |
|---|---|---|
| 2,107,851 | Boehm | Feb. 8, 1938 |
| 2,556,568 | Aikman | June 12, 1951 |
| 2,573,872 | Reed | Nov. 6, 1951 |
| 2,625,893 | Semple | Jan. 20, 1953 |
| 2,628,907 | Darden | Feb. 17, 1953 |
| 2,679,969 | Richter | June 1, 1954 |
| 2,697,531 | Hood | Dec. 21, 1954 |